United States Patent [19]

Curry

[11] 4,439,273
[45] Mar. 27, 1984

[54] WET PRESS FELT FOR PAPERMAKING MACHINE

[75] Inventor: Thomas H. Curry, Clifton Park, N.Y.

[73] Assignee: Albany International Corp., Albany, N.Y.

[21] Appl. No.: 408,176

[22] Filed: Aug. 11, 1982

Related U.S. Application Data

[63] Continuation-in-part of Ser. No. 214,707, Dec. 10, 1980, abandoned.

[51] Int. Cl.³ .............................................. D21F 7/08
[52] U.S. Cl. ............................... 162/358; 139/383 A; 34/243 F; 428/233; 428/239; 428/280; 428/282
[58] Field of Search ................. 162/358, DIG. 1; 428/234, 235, 280, 282, 300, 227, 233, 246, 239; 28/103, 110, 257; 139/383 A, 383 R; 34/243 F, 95

[56] References Cited

U.S. PATENT DOCUMENTS

| | | | |
|---|---|---|---|
| 3,030,690 | 4/1962 | Mizell | 428/227 |
| 3,341,394 | 9/1967 | Kinney et al. | 28/257 |
| 3,392,079 | 7/1968 | Fekete | 428/300 |
| 3,928,699 | 12/1975 | Fekete | 428/300 |
| 4,107,367 | 8/1978 | Fekete | 162/358 |
| 4,283,454 | 8/1981 | Buchanan | 428/280 |

*Primary Examiner*—Steve Alvo
*Attorney, Agent, or Firm*—Kane, Dalsimer, Kane, Sullivan and Kurucz

[57] ABSTRACT

A wet press felt for use on papermaking machines is disclosed. The wet press felt of the invention comprises a conventional felt fabric having a special finish or surface for receiving the paper sheet. This special sheet surface comprises a layer of a substantially uniform, non-woven spun-bonded, synthetic organic filaments which are substantially round in cross-section and randomly distributed throughout the layer.

1 Claim, 1 Drawing Figure

U.S. Patent  Mar. 27, 1984  4,439,273
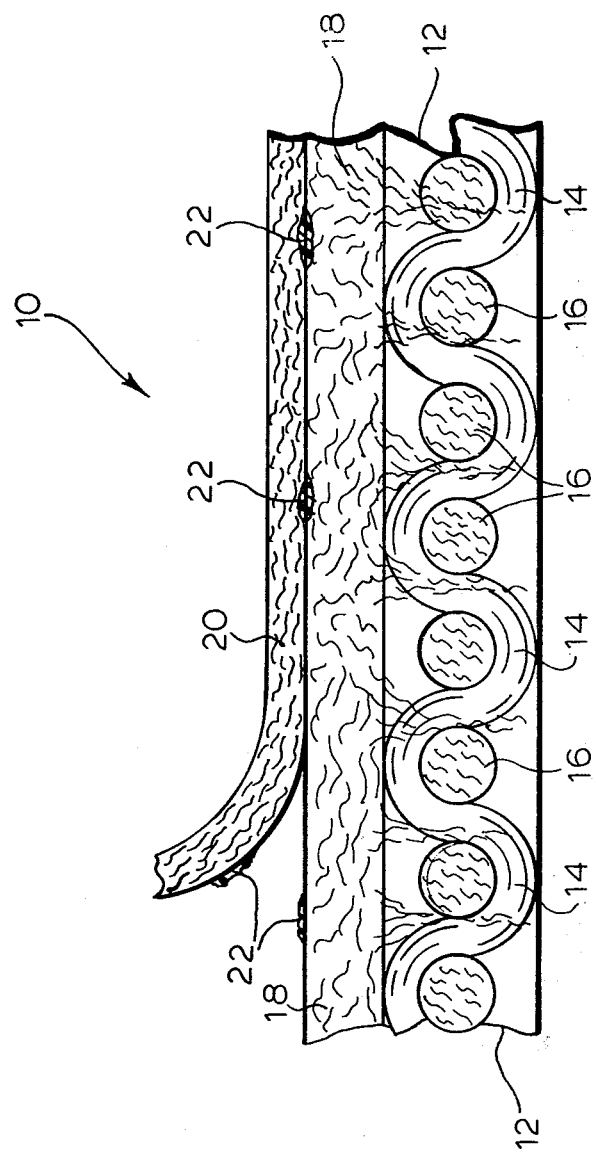

WET PRESS FELT FOR PAPERMAKING MACHINE

CROSS-REFERENCE TO RELATED APPLICATION

This application is a continuation-in-part of copending U.S. patent application Ser. No. 214,707; filed Dec. 10, 1980, now abandoned.

BACKGROUND OF THE INVENTION

1. Field of the Invention

The invention relates to papermaking machine clothing and more particularly relates to an improved wet press felt for use on papermaking machines.

2. Brief Description of the Prior Art

The prior art is replete with descriptions of wet press felts; see for example the descriptions given in U.S. Pat. Nos. 3,097,413; 3,365,766; 3,401,467; 3,613,258; 3,928,699; 4,107,367; 4,162,190; and 4,187,618. However, the prior art wet press felts have not been satisfactory in all respects. For example, during their use cellulose fibers and other small particles of dirt, debris and fibrous knots associated with the paper furnish are trapped in the interstices of the felt structure after being carried therein by the flow of water removed from the paper sheet. Over a period of time, these trapped materials clog the felt and interfere with drainage of water through the felt and away from the wet paper sheet. This of course reduces the efficiency of the papermaking machine.

SUMMARY OF THE INVENTION

The invention comprises in a wet press felt for use in a papermaking machine, which comprises an outer textile face layer for receiving and supporting a wet paper sheet during its passage through the nip of a wet press in the papermaking machine; a lower backside layer for supporting the felt on a papermaking machine; and an intermediate textile fabric layer between the outer textile face layer and the lower backside layer, the improvement, which comprises; said outer textile face layer being a sheet of spun-bonded, formed fabric comprising a substantially uniform layer of non-woven, synthetic organic filaments, said filaments being substantially round in cross-section and randomly distributed throughout the layer and so disposed as to be substantially separate and independent of each other except at filament cross over points where the filaments are bonded together, said layer presenting a smooth, substantially unbroken surface which is porous, permitting only particles of less than about 35 microns in diameter to pass through.

The press felts of the invention are characterized in part by an exceptionally smooth paper support surface, which feature aids in minimizing rewetting of the paper sheet as it leaves the press nip. The exceptionally smooth paper support surface also minimizes opportunity for sheet drop offs and sheet blowing. The smooth surface of the felt of the invention also provides an optimum pressing surface for improved paper sheet finishes.

The wet press felts of the present invention are an improvement over prior art felts in that they resist penetration and trapping of contaminate particles from the paper furnish, during operation of the papermaking machine. This permits the felt to remain clean throughout its normal operating life. The contaminate debris is confined to the smooth surface of the wet press felt and from that position can be washed off readily with a low pressure shower. This improvement is due in part to the unique structure of the improved wet press felts of the invention, wherein the surface in contact with and supporting the wet paper sheet has only horizontally disposed textile fibers (the prior art felts generally include vertically disposed textile fibers in this location).

BRIEF DESCRIPTION OF THE DRAWING

The accompanying drawing is a cross-sectional, side elevation of a portion of an embodiment wet press felt of the invention.

DETAILED DESCRIPTION OF THE PREFERRED EMBODIMENTS OF THE INVENTION

The accompanying drawing is a cross-sectional, side elevation of a portion of an embodiment wet press felt 10 of the invention. The embodiment felt 10 comprises a base fabric 12 of the interwoven lengthwise yarns 14 and cross wise or filling yarns 16. The yarns 14, 16 may be any conventional textile yarns such as mono-, or multi-filament, or spun yarns of natural or synthetic textile fibers. Representatives of such yarns are monofilaments of polyolefins such as polyethylene, polypropylene and the like, polyacrylics, polyamides, polyimides, polyesters and the like. Also representative of the yarns 14, 16 are multi-filament or spun yarns of wool, polyesters, polyamides, polyacrylics, blends thereof and the like.

In the drawing, the yarns 14, 16 are shown in a simple, single layer weave. However, those skilled in the art will appreciate that the base fabric 12 as any wet press felt may be fabricated in any conventional weave, simple or complex, single or multi-layered as conventionally known.

As also shown in the drawing, the base fabric 12 has been structurally integrated with a non-woven batt 18 of textile fibers attached to the base fabric 12 by needling. Needling is a well-known technique for consolidating and stabilizing felt structures. The non-woven batt 18 needled to base fabric 12 may be made up of any conventional textile fibers. Representative of such non-woven textile fibers are fibers of polyesters, polyolefins, polyamides and the like.

The needled composite of base fabric 12 and batt 18 by themselves constitute a wet press fabric of the prior art and may be prepared in any of the conventional weights and thicknesses employed for wet press felts.

Adhered to the outer surface of the non-woven batt 18 is a layer 20 of non-woven, non-parallel, continuous, synthetic organic filaments. The filaments are preferably substantialy round in cross-section and randomly distributed in the layer 20 and so disposed as to be parallel to the batt 18 and substantially separate and independent of each other except at filament cross-over points where they are bonded together. The filaments making up the layer 20 may be made from a wide variety of synthetic, polymeric resins such as, for example, polyamides, polyesters, polyethylene, polypropylene, polyurethane, polycarbonates and the like. The method of forming layers 20 from such continuous filaments is well-known; see for example the spun-bonding method described in U.S. Pat. No. 3,341,394. Sheets of material suitable for use as a layer 20 are also commercially available and are represented by the product Reemay (E. I. DuPont DeNemours & Company, Inc.; see DuPont Bulletin NP-38 dated August 1967). This spunbonded sheet material is particularly advantageous in that it provides optimum inhibition of rewetting of the wet paper sheet as it leaves the press nip. Reemay is porous, permitting only particles of less than about 35 microns in diameter to pass through.

Another advantageous layer 20 may be formed from a sheet of spun-laced, chopped filament (staple fibers) such as the formed fabric sold by E. I. DuPont, supra., under the tradename Sontara (see Product Buleltin SN-1, June 1979). The staple fibers are oriented in a horizontal position in its formed fabric.

A wide variety of weights and thicknesses for the sheet layer 20 may be employed. Preferably, however, the layer 20 will be, as initially provided, a weight within the range of from about 50.9 to about 101.7 grams per square meter and they will have a thickness within the range of from about 10 to about 20 mils. The layer 20, affixed to the outer surface of batt 18 provides an exceptionally smooth surface and also functions to filter the previously described contaminant particles larger than about 35 microns from entering into the body structure of the base fabric 12 or the layer 18. Generally, the layer 20 is unbroken and free of blemishes which would detract from its smoothness.

As also shown in the drawing, the layer 20 is adhered to the outer surface of the batt 18 by adhesive components 22. The layer 20 has been peeled back in the drawing to show more clearly the adhesive component 22. By using an adhesive rather than, for example, needling, the smooth, unbroken outer surface of the layer 20 is maintained as an extremely smooth support surface to receive the wet paper on the papermaking machine. The backside of the fabric 10, i.e.; the outer surface of base fabric 12 supports the felt 10 on the papermaking machine and need not have the extreme smooth surface found on the outer surface of layer 20. The adhesive components 22 are advantageously disposed in disperse locations between the batt 18 and layer 20. This is so that porosity of the felt 10 is not impaired. The adhesive components 20 may be fused, thermoplastic, adhesive fibers or yarns liberally disposed on the surface of batt 18 and fused thereon with heat and pressure following layover with the layer 20. A preferred procedure for adhering the layer 20 to batt 18 following needling of the batt 18 to the base fabric 12 is to employ a controlled heating cylinder dryer. After disposing a plurality of hot melt adhesive fibers between the batt 18 and layer 20, the face of the layer 20 is passed over the heated cylinder dryer at a temperature sufficient to fuse the dispersed adhesive materials. This fuses the layer 20 to the outer surface of batt 18. Thermoplastic, hot melt adhesive fibers are well-known in the art and may be nylon or polyester based materials as representative adhesive materials.

Thermoplastic adhesives activated by heating are not the only means of adhering layer 20 to batt 18. For example, a pressure-sensitive adhesive may be used and the layer 20 adhered to batt 18 by pressure alone to obtain a laminate 10.

The wet press felts of the invention are of course employed in an endless form. The fabric constituting the felt may be made endless by any conventional method for seaming ends together. When made endless, the wet press felts of the invention are mounted in the wet press section of a conventional papermaking machine for use thereon.

The following example describes the manner and process of making and using the invention and sets forth the best mode contemplated by the inventor of carrying out the invention, but is not to be construed as limiting.

EXAMPLE

A conventional batt-on base type wet press felt comprised of a nylon fiber web needled to a woven polyaramid yarn base is provided. A sheet of fusible polyester fibers is placed on the upper surface of the felt and sandwiched between the felt and a web of Reemay (E. I. DuPont, supra.). The sandwich is placed on a cylinder dryer and pressed against the hot (300° F.) cylinder for 90 seconds to fuse the fusible polyester fibers. The product is allowed to cool. The resulting wet press felt has a reduction in air permeability of 11 to 16 percent.

Those skilled in the art will appreciate that the invention can be used to improve any of the base structures which are currently used in the making of wet press felts. The base can be single, double, or triple layer in any weave pattern and can use monofilaments, multifilament spun yarns, or a combination of yarns. The base structure is not a factor in the application of this invention. By the same token the web blends used can be of any of the currently used batt fibers from 3–65 denier and are attached via the normal needling process.

What is claimed:

1. In a wet press felt for use in a papermaking machine, which comprises an outer textile face layer for receiving and supporting a wet paper sheet during its passage through the nip of a wet press in the papermaking machine;

a lower backside layer for supporting the felt on the papermaking machine; and an intermediate textile fabric layer between the outer textile face layer and the lower backside layer, the improvement, which comprises; said outer textile face layer being a sheet of spun-bonded, formed fabric comprising a substantially uniform layer of non-woven, synethetic organic filaments, said filaments being substantially round in cross-section and randomly distributed throughout the layer and so disposed as to be substantially separate and independent of each other except at filament cross-over points, where the filaments are bonded together, said layer presenting a smooth, substantially unbroken surface which is porous, permitting only particles of less than about 35 microns in diameter to pass through, said face layer being secured to the intermediate layer by an adhesive disposed in disperse locations between the face layer and the intermediate layer so that porosity of the felt is not impaired.

* * * * *